United States Patent [19]

Ross

[11] Patent Number: 4,694,134
[45] Date of Patent: Sep. 15, 1987

[54] APPARATUS FOR OVERHEATING EDGES OF SKELP FOR THE PRODUCTION OF COMPRESSION WELDED PIPE

[75] Inventor: Nicholas V. Ross, Youngstown, Ohio

[73] Assignee: Ajax Magnethermic Corporation, Warren, Ohio

[21] Appl. No.: 738,361

[22] Filed: May 28, 1985

[51] Int. Cl.$^4$ .............................................. H05B 6/40
[52] U.S. Cl. .................................. 219/10.79; 219/8.5; 219/9.5
[58] Field of Search .................. 219/10.79, 10.57, 9.5, 219/8.5, 10.49 R, 10.43, 10.71, 10.75, 10.67, 10.61 R; 336/223, 225, 234

[56] References Cited

U.S. PATENT DOCUMENTS

| | | | |
|---|---|---|---|
| 1,365,199 | 1/1921 | Sessions | 219/10.79 |
| 2,582,963 | 1/1952 | Cachat | 219/8.5 |
| 2,629,811 | 2/1953 | Cachat | 219/8.5 |
| 2,635,177 | 4/1953 | Body | 219/8.5 |
| 2,652,474 | 9/1953 | Sorensen | 219/10.79 |
| 2,673,274 | 3/1954 | Vaughan | 219/10.61 |
| 2,678,368 | 5/1954 | Williamson | 219/8.5 |
| 2,708,704 | 5/1955 | Duda, Jr. | 219/10.79 |
| 2,715,170 | 8/1955 | Sorensen | 219/10.53 |
| 3,242,301 | 3/1966 | Osborn | 219/8.5 |
| 3,248,512 | 4/1966 | Sommer | 219/8.5 |
| 3,446,930 | 5/1969 | Seulen et al. | 219/10.79 X |
| 3,842,234 | 10/1974 | Seyfried | 219/10.79 |
| 4,357,512 | 11/1982 | Nishimoto | 219/8.5 |

Primary Examiner—Philip H. Leung
Attorney, Agent, or Firm—J. Helen Slough

[57] ABSTRACT

Apparatus for overheating the edges of a preheated formed skelp for the purpose of butt welding the skelp into pipe or tube. Induction coil assembly consisting of two (2) series connected loops, with a main conductor of each loop positioned within a magnetic flux guide and positioned adjacent to the open edges of the C-shaped skelp and the return conductors of each loop arranged externally on opposite side of the flux guide, providing localized overheating of the edges of the skelp prior to welding.

4 Claims, 8 Drawing Figures

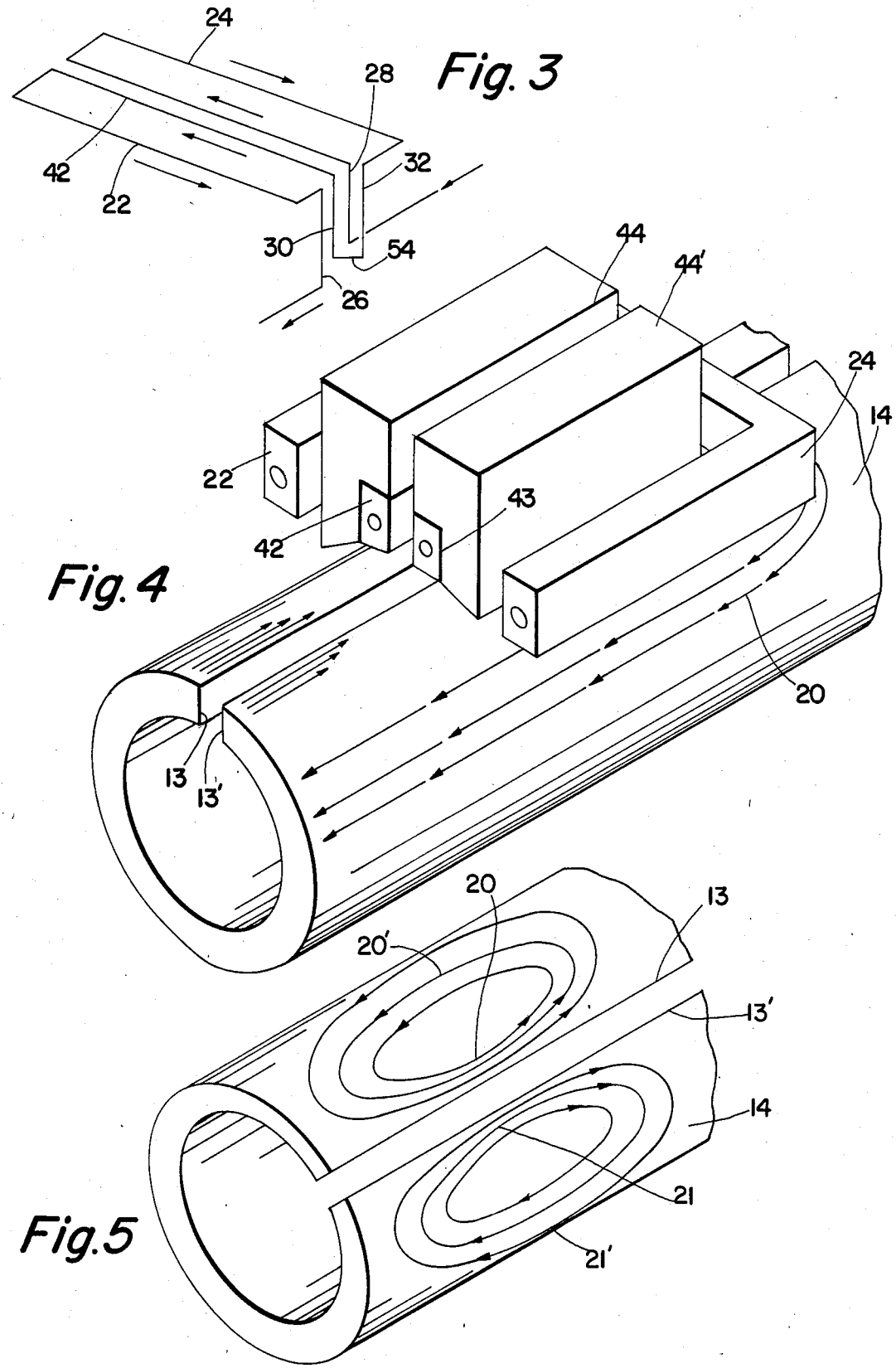

APPARATUS FOR OVERHEATING EDGES OF SKELP FOR THE PRODUCTION OF COMPRESSION WELDED PIPE

BACKGROUND OF THE INVENTION

This invention relates to improvements in induction means or method of heating the edges of a tube formed from skelp and relates particularly to the overheating of edges prior to butt welding of the edges by compression.

Most of the presently operating hot mills preheat skelp uniformly in fossil-fueled furnaces and, as the skelp exits from the furnace, quickly form it into an open C-shape and then apply compressive force simultaneous with the introduction of an oxygen stream which provides the temperature necessary to weld the edges of the tube together. Preheat temperatures required by this process result in the generation of large quantities of scale which not only reduce the productive capability of the installation but provide for the potential of entrapment of scale within the weld and result in an inferior product.

The design of fossil fuel furnaces used to heat strip prior to welding is established by the throughput in tons per hour, the desired temperature, and the skelp width and thickness. Most often, the skelp will reverse its direction in the furnace a number of times to reduce the floor space required and, by making the furnace more compact, increase the thermal efficiency of the heating operation. The maximum rate of heat transfer is a function of the temperature difference between the hot gases and the cooler strip. If a strip temperature of 2400° F. is desired, an overtemperature of the hot gases of 200° F. may be required to keep the size of the furnace reasonable. At this temperature, the skelp oxidizes rapidly.

Other means for providing energy for overheating the edges of the skelp may be employed whereby the temperature of the strip as it exits the furnace can be reduced. This can result in many operating benefits. Various induction means have been proposed to overheat the edges to achieve reduction of scale loss and improvement of the quality of the weld. In U.S. Pat. No. 2,673,274 to Vaughan, an induction heating coil is proposed to overheat the edges while the skelp is flat. A preheat temperature of 1500° is suggested. In a more recent U.S. Pat. No. 4,375,512 to Nishimoto, an alternative induction means is described which results in overheating the edges of the skelp. In that patent, a preheat temperature of 1832° F. is suggested. In both these methods, because of the time required for the skelp to pass from the influence of the induction heating coil to the weld zone, the temperature of the edges decreases and it is hence necessary to heat a greater portion of the skelp to a higher temperature than would be required if the heating were applied just prior to the weld rolls. Various other methods have been proposed, such as that disclosed in U.S. Pat. No. 2,652,474 to Sorensen, utilizing induction heating to heat the edges of skelp that has been cold formed. This inductor configuration does not provide for equal heating of the opposing edges under usual operating conditions.

SUMMARY OF THE INVENTION

The present invention is directed at solving the problems that exist in installations that utilize fuel-fired furnaces exclusively, as well as at obtaining higher efficiencies than have been available in prior constructions for inductively overheating the edges of the skelp that has been preheated in a fuel-fired furnace. It is an object of this invention to provide an induction heating coil that will produce sufficient overheating of the edges of previously heated skelp to reduce the requirements for heating within the preheating furnace and thereby allowing a reduction of the operating temperature of the furnace, with a consequent reduction of formation of scale within the furnace.

A further object of this invention is to provide an inductor to reduce the amount of energy required to produce welded steel tubing. Another object of this invention is to reduce the amount of metal in the skelp that is raised to welding temperature so as to reduce the amount of upset of the material as the skelp is welded into a closed tube.

Another object of this invention is to reduce the sensitivity of the process to the actual positioning of the seam or spaced edges of the skelp at the time of welding and provide greater tolerance for the possible misalignment of the edges with respect to the inductor prior to their jointure.

Other objects of the invention and the invention itself will be more readily apparent from a purview of the appended drawings and specification, in which drawings:

BRIEF DESCRIPTION OF THE DRAWINGS

FIG. 3 is a schematic representation showing the conductors of the coil of FIG. 2 and their interconnection.

FIG. 4 is a broken perspective view of the inductor of FIG. 2.

FIG. 5 is a broken perspective view of a section of the C-shaped skelp showing currents induced in the skelp by the induction coil of FIG. 2.

DESCRIPTION OF THE PREFERRED EMBODIMENT

I will first describe the overall process of heating the skelp, forming it into a C-shape, and then overheating the edges and finally welding it into a closed tubing according to the invention.

Figures 1, 2:
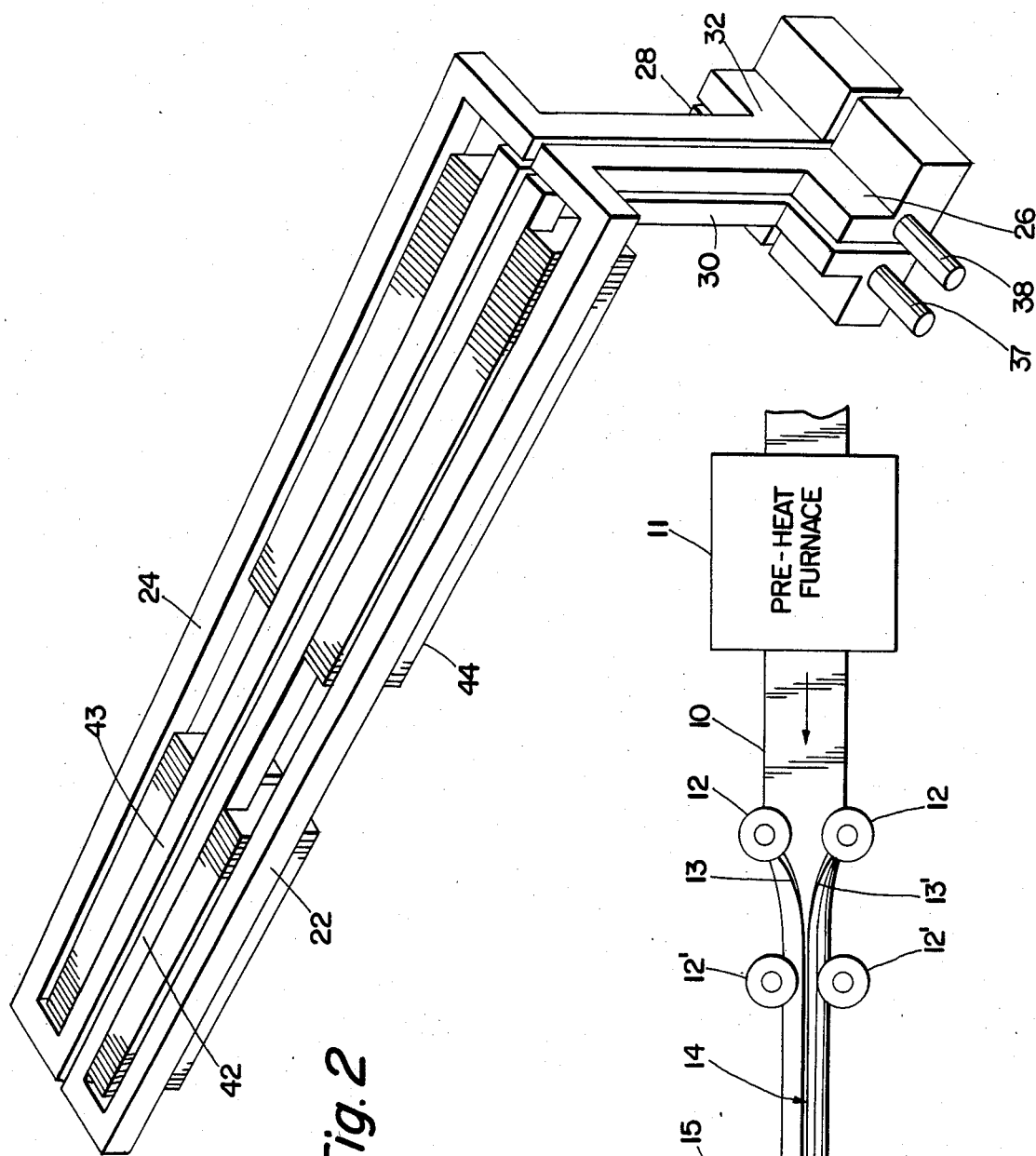
FIG. 1 is a pictorial plan view of a tube forming and welding mill showing the preheat furnace, forming rolls, and induction coil and finally the weld rolls.
FIG. 2 is a perspective view of the induction coil of FIG. 1.

In FIG. 1, a flat skelp 10 is passed through a preheat furnace 11 to achieve the strip temperature between 1500° F. and 2000° F. The skelp is then formed into a C-shape by a pair of rolls 12 or a series of rolls 12', etc. The seam 14 formed by the spaced linear edges 13 and 13' of the skelp passes adjacent and in spaced relation to the induction heating coil 15 where the edges of the seam are overheated to the required welding temperature. The skelp is then compressed by the welding rolls 17 producing a butt weld between the edges of the seam. Tube 18 thus has a weld zone 16 which may be thicker than the original skelp thickness. This increase in section is termed "upset".

In FIG. 2, the induction heating coil 15 of FIG. 1 is shown comprised of two (2) series connected loops formed from hollow water cooled conductors. The first loop is composed of inner conductor 43 and an outer conductor 24. The second loop is composed of inner conductor 42 and an outer conductor 22. The inner conductors 42 and 43 are insulated from each other (not shown) and placed within magnetic flux guides 44. The flux guides 44 may be insulated electrically from the conductors or preferably they may be split in two pieces 44 and 44', as also shown in FIG. 4, and joined to conductors 42 and 43 in order that their internal losses might be dissipated in the cooling water of the hollow conductors. In FIG. 2, a portion of the magnetic flux guides 44 are shown removed to further illustrate the construction used therein. The two loops are terminated in connections typically shown as 26, 28, 30 and 32. Cooling water to remove the losses caused by electrical currents flowing within the conductors can enter and depart the cooling passages in the conductor via connection tubes shown as 37 and 38.

FIG. 3 is a diagrammatic drawing of the conductors which form the current carrying parts of the induction heating coil 15 of FIG. 2. The main conductors 42 and 43 and the return conductors 22 and 24 that form the two loops of the heating coil are shown. Also shown are the leads 26, 28, 30 and 32 which connect to the two loops. The loops are placed electrically in series by the jumper 54 which joins leads 26 and 28. Leads 30 and 32 are the connections to the power source that supplies the AC current necessary to produce the induction heating field for the welding process.

As shown in FIG. 7, the two main conductors 42 and 43 are positioned in spaced proximity to the open edges of the formed skelp. The use of series connection of the two loops results in the equality of currents in both conductors 42 and 43 and in even heating of edges 13 and 13'. Previous construction utilized parallel connection of the inductor loops and equality of the currents could not be assured.

FIG. 4 shows a cut-away isometric view of the portion of the induction heating coil 15, and a corresponding section of the formed C-shaped skelp 14 prior to its passage through weld rolls 17. As can be seen, the main conductors 42 and 43 are positioned within the magnetic flux guides 44 and 44' while the return conductors 22 and 24 are positioned external to the magnetic flux guides in spaced relation thereto.

FIG. 5 shows the formed skelp 14 and illustrates the current paths that result from the induction heating coil of the invention. Note that the main heating currents 20 and 21 which are adjacent to conductors 42 and 43, respectively, produce a concentration of current along the edges 13 and 13' of the formed skelp while the return currents 20' and 21' are distributed over a wide area. This concentration of current produces a favorable distribution of energy within the skelp whereby most of the energy is concentrated along the edge and therefore results in high electrical efficiency.

Figure 6:
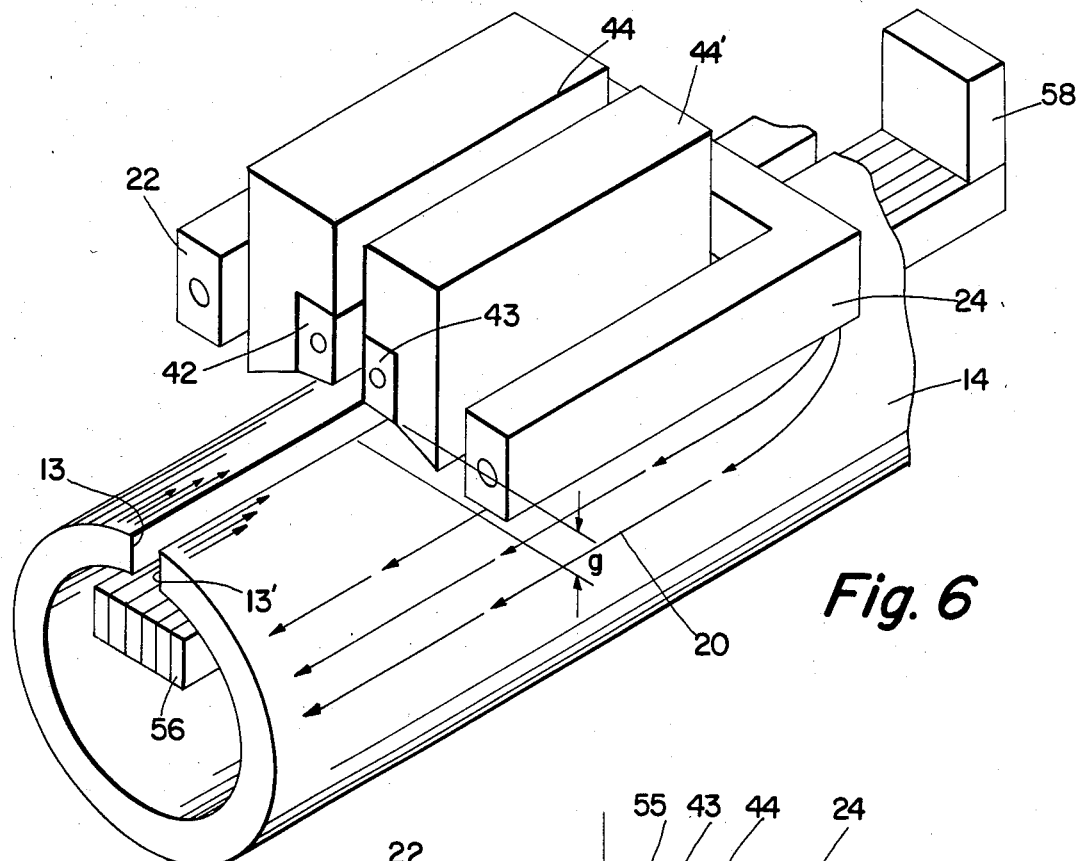
FIG. 6 is a broken perspective view of the inductor of FIG. 1 located adjacent to the seam of the C-shaped skelp, with a magnetic flux guide shown interior to the C-shaped skelp.

FIG. 6 shows the same broken isometric view of FIG. 4 with an additional magnetic flux guide 56 inserted within the formed skelp 14. The purpose of this additional guide is to assist in further concentration of currents 20 and 21 of FIG. 5 along the edge of the skelp and thereby improve the operating efficiency of the system. The interior magnetic flux guide 56 may be supported on the mill and in a position prior to passage through the forming rolls 12 where the skelp is an open C-shape.

Figure 7A:
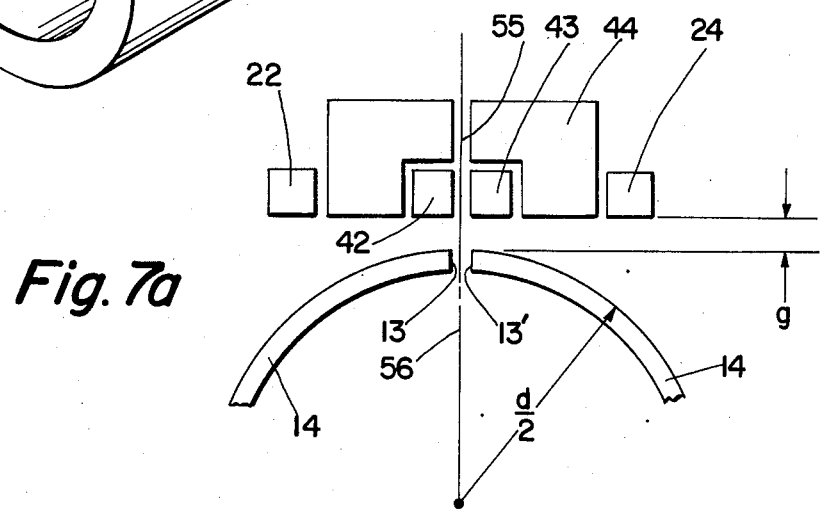
FIGS. 7a and 7b are cross-sectional views of the inductor of FIG. 2 placed adjacent to the seam of the C-shaped skelp, FIG. 7b illustrating misalignment of the seam with respect to the centerline of the induction coil.

FIG. 7 is a cross-sectional view cut through the induction heating coil 15 and the formed skelp 14. In order for the edges 13 and 13' of the formed skelp to achieve substantially the same temperature to provide a weld of superior quality the edges must have substantially the same current in each of the edges. In the induction heating coil of this invention currents in main conductors 42 and 43 are exactly equal. In the cross-section view of FIG. 7a the centerline of the induction coil assembly and the centerline of the gap or open seam in the formed skelp 56 are shown to be coincident and it can be expected that the currents in the edges 13 and 13' and the temperatures of the edges 13 and 13' will be essentially equal.

Figure 7B:
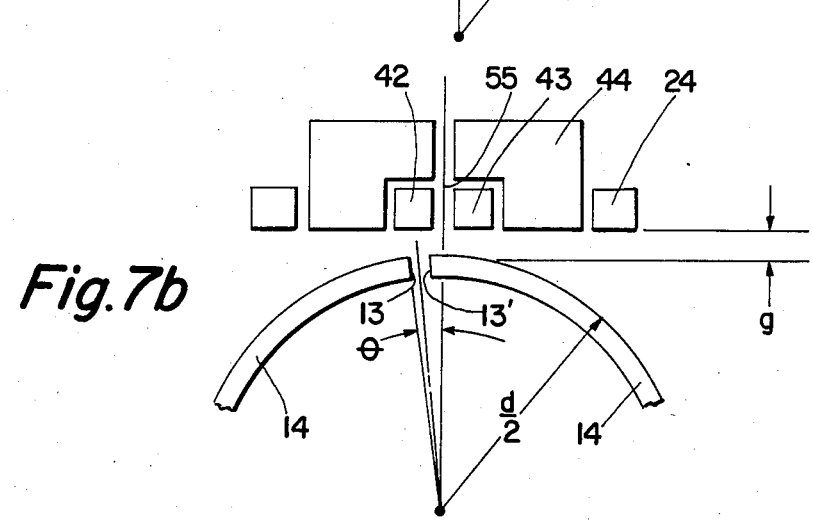

As the skelp passes through the mill, it is not unusual for the formed C-shape to rotate around the longitudinal axis of the tube and the seam is thereby displaced from the neutral position shown in FIG. 7a. FIG. 7b shows the centerline displaced to the left or counter-clockwise position by an angle $\theta$ from the centerline, 55, of the induction heating coil assembly. I have found that a satisfactory weld may be obtained with angular displacements up to 5° when welding a 5" diameter tube. This tolerance for angular displacement of the closed seam formed by the edges, 13 and 13', and the inductor centerline, 55, can be expressed by the formula $$\theta = \arcsin\left(\frac{\text{Depth of Penetration \& Edge Gap}}{\text{Tube Diameter}}\right)$$

where depth of penetration is defined by the equation, $$d = 3160\sqrt{\frac{p}{f}},$$

with p in ohm inches, and f in Hertz.

If the angular displacement of the centerline of the formed skelp is within the maximum tolerance angle a satisfactory weld can be achieved. If this angle is exceeded, other problems associated with the welding process may occur and will require adjustments of the mill. It has been found preferable that the gap between the formed skelp and the inductor be kept to a minimum as the efficiency of the operation decreases if this spacing increases.

Although preferred embodiments have been described and illustrated herein, the invention is not intended to be limited thereby, except by the appended claims.

What I claim is:

1. Induction heating apparatus for the overheating of the edges of preheated skelp which has been formed into a circular open shape, said apparatus comprising an induction heating coil assembly having a pair of electrically series-connected loops, each loop having a main conductor and a return conductor co-planar therewith, said main conductors being positioned within magnetic flux guides disposed over the outermost and uppermost sides of each of the said main conductors, which main conductors are each adapted to be positioned in spaced proximity to a different linear edge of the preheated open skelp to concentrate the currents along the said edges of the skelp and to provide uniform equal localized heating to welding temperature of both said preheated edges to weld the same, the return conductors positioned externally to the flux guides providing a distribution of return currents over a relatively greater area.

2. The apparatus in claim 1 wherein the pair of series-connected loops are interconnected by a cross-over connection.

3. The apparatus in claim 1 wherein the apparatus includes a flux guide positioned within the circular open skelp facing the induction coil.

4. Apparatus of claim 1 wherein the return conductors positioned externally to the flux guide are disposed in spaced and substantially parallel relation thereto.

* * * * *